United States Patent
Gabbianelli et al.

(10) Patent No.: US 6,566,624 B2
(45) Date of Patent: *May 20, 2003

(54) WELDING ASSEMBLY WITH NESTABLE CONDUCTIVE ENDS

(75) Inventors: Gianfranco Gabbianelli, Troy, MI (US); Victor J. Malczewski, Warren, MI (US); Richard Ashley, Berkley, MI (US)

(73) Assignee: Magna International Inc., Aurora (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/754,114

(22) Filed: Jan. 5, 2001

(65) Prior Publication Data

US 2001/0019039 A1 Sep. 6, 2001

Related U.S. Application Data

(63) Continuation-in-part of application No. 09/518,646, filed on Mar. 3, 2000.

(51) Int. Cl.[7] .............................. B23K 11/00; B23K 1/16; B23K 31/02
(52) U.S. Cl. ..................... 219/117.1; 219/94; 219/64; 219/60 A; 219/61.1; 219/61.2
(58) Field of Search ..................... 219/64, 59.1, 61.1, 219/110, 61.2, 78.01, 607, 60 A, 117.1, 94; 269/16, 287

(56) References Cited

U.S. PATENT DOCUMENTS

| | | | |
|---|---|---|---|
| 1,581,931 A | 4/1926 | Lamplugh | |
| 1,846,567 A | 2/1932 | Murray, Jr. | |
| 2,269,451 A | 1/1942 | Ford | 296/28 |
| 2,389,907 A | 11/1945 | Helmuth | 296/28 |
| 2,467,636 A | 4/1949 | Stoudt et al. | |
| 2,668,722 A | 2/1954 | Muller | 280/106 |
| 3,159,419 A | 12/1964 | Kerby | 296/28 |
| 3,630,056 A | 12/1971 | Cuq | 72/28 |
| 3,644,695 A * | 2/1972 | Shuey et al. | 219/59.1 |
| 3,718,798 A * | 2/1973 | Randolph et al. | 219/125.12 |
| 3,876,852 A * | 4/1975 | Topham | 219/137 R |

(List continued on next page.)

FOREIGN PATENT DOCUMENTS

| | | |
|---|---|---|
| DE | 867059 | 1/1953 |
| DE | 4122862 | 1/1993 |
| EP | 0 457 400 A1 | 11/1991 |
| EP | 0457400 A1 * | 11/1991 |
| EP | 0570150 A1 | 11/1993 |
| FR | 694774 | 12/1930 |
| JP | 2000-17338 A * | 1/2000 |
| WO | WO97/00595 | 1/1997 |

*Primary Examiner*—M. Alexandra Elve
*Assistant Examiner*—L. Edmondson
(74) *Attorney, Agent, or Firm*—Pillsbury Winthrop LLP

(57) ABSTRACT

A welding material in positioned in electrically conductive relation between exterior surface portions of first and second weldable members, such as hydroformed tubes, at a location where the first and second weldable members are to be joined. A welding device comprises first and second electrodes or conductive ends that extend along substantially the entire extent of first sides of the first and second weldable members, respectively. The first and second conductive ends include first and second concave recesses, which nest with the first and second weldable members, respectively. Electrical current is applied across the first and second weldable members by the nesting first and second conductive ends such that the applied current melts the welding material and thereby welds the exterior surface portions to one another. The welding device can be mounted on a robotic mechanism, which can move the welding device between first and second welding positions.

15 Claims, 10 Drawing Sheets

U.S. PATENT DOCUMENTS

| | | | |
|---|---|---|---|
| 3,971,588 A | | 7/1976 | Bauer .................... 296/28 |
| 4,192,374 A | * | 3/1980 | Hayden et al. ............. 165/158 |
| 4,355,844 A | | 10/1982 | Muzzarelli .................. 296/205 |
| 4,408,112 A | * | 10/1983 | Kazlauskas .................. 219/61 |
| 4,441,006 A | | 4/1984 | Machida et al. |
| 4,471,519 A | | 9/1984 | Capello et al. ............... 29/460 |
| 4,592,577 A | * | 6/1986 | Ayres et al. ............. 285/288.1 |
| 4,611,830 A | * | 9/1986 | von Ahrens .................. 219/53 |
| 4,618,163 A | | 10/1986 | Hasler et al. ............... 280/785 |
| 4,648,208 A | | 3/1987 | Baldamus et al. ............ 49/502 |
| 4,656,328 A | * | 4/1987 | Weldon et al. ............. 219/59.1 |
| 4,660,345 A | | 4/1987 | Browning |
| 4,726,166 A | | 2/1988 | DeRees ....................... 52/694 |
| 4,728,760 A | * | 3/1988 | Brolin et al. ............... 219/617 |
| 4,735,355 A | | 4/1988 | Browning ................... 228/189 |
| 4,759,111 A | | 7/1988 | Cudini ....................... 29/523 |
| 4,835,356 A | * | 5/1989 | Abe .......................... 219/119 |
| 4,886,203 A | * | 12/1989 | Puzrin et al. ............. 219/59.1 |
| 4,906,313 A | * | 3/1990 | Hill ....................... 219/137 R |
| 4,933,531 A | * | 6/1990 | Ichikawa et al. ........ 219/86.25 |
| 4,986,597 A | | 1/1991 | Clausen ..................... 296/205 |
| 5,031,958 A | | 7/1991 | Fujita et al. ................ 296/194 |
| 5,094,313 A | | 3/1992 | Mauws ....................... 180/210 |
| 5,106,249 A | | 4/1992 | Janotik ....................... 411/43 |
| 5,107,095 A | * | 4/1992 | Derbyshire ................. 219/230 |
| 5,170,557 A | * | 12/1992 | Rigsby ....................... 138/148 |
| 5,209,541 A | | 5/1993 | Janotik et al. ................. 296/29 |
| 5,213,386 A | | 5/1993 | Janotik et al. ................. 296/29 |
| 5,228,259 A | | 7/1993 | Haddad et al. ............. 52/653.2 |
| 5,233,789 A | | 8/1993 | Priest et al. .................. 49/360 |
| 5,233,856 A | | 8/1993 | Shimanovski et al. ......... 72/62 |
| 5,269,585 A | | 12/1993 | Klages et al. ............... 296/205 |
| 5,271,687 A | | 12/1993 | Holka et al. ................ 403/233 |
| 5,320,403 A | | 6/1994 | Kazyak ....................... 296/203 |
| 5,320,697 A | * | 6/1994 | Hegler et al. ............... 219/110 |
| 5,332,281 A | | 7/1994 | Janotik et al. ............... 296/209 |
| 5,333,775 A | * | 8/1994 | Bruggemann et al. ...... 228/155 |
| 5,338,080 A | | 8/1994 | Janotik et al. ................. 296/29 |
| 5,343,666 A | | 9/1994 | Haddad et al. ............. 52/648.1 |
| 5,380,978 A | * | 1/1995 | Pryor ..................... 219/125.12 |
| 5,389,760 A | * | 2/1995 | Zollinger ..................... 219/53 |
| 5,407,514 A | * | 4/1995 | Butts et al. ............. 219/137 R |
| 5,407,520 A | * | 4/1995 | Butts et al. .................. 228/155 |
| 5,458,393 A | | 10/1995 | Benedyk ................... 296/203 |
| 5,460,026 A | | 10/1995 | Schafer ........................ 72/55 |
| 5,481,892 A | | 1/1996 | Roper et al. ................... 72/61 |
| 5,518,209 A | | 5/1996 | Chicoine et al. ........ 244/158 R |
| 5,549,352 A | | 8/1996 | Janotik et al. ............... 296/209 |
| 5,561,902 A | | 10/1996 | Jacobs et al. ............... 29/897.2 |
| 5,564,785 A | | 10/1996 | Schultz et al. ............ 297/452.2 |
| 5,577,796 A | | 11/1996 | Clausen ..................... 296/202 |
| 5,581,947 A | | 12/1996 | Kowall et al. ................. 49/451 |
| 5,582,052 A | | 12/1996 | Rigsby ......................... 72/62 |
| 5,600,983 A | | 2/1997 | Rigsby ......................... 72/61 |
| 5,641,176 A | | 6/1997 | Alatalo ....................... 280/690 |
| 5,649,735 A | | 7/1997 | Tomforde et al. ............. 296/71 |
| 5,673,929 A | | 10/1997 | Alatalo ....................... 280/690 |
| 5,718,048 A | | 2/1998 | Horton et al. ............. 29/897.2 |
| 5,720,092 A | | 2/1998 | Ni et al. .................... 29/421.1 |
| 5,720,511 A | | 2/1998 | Benedyk ..................... 296/203 |
| 5,729,463 A | * | 3/1998 | Koenig et al. .............. 219/119 |
| 5,765,906 A | | 6/1998 | Iwatsuki et al. ............ 296/203 |
| 5,783,794 A | * | 7/1998 | Oikawa et al. ............. 138/148 |
| 5,794,398 A | | 8/1998 | Kaehler et al. ............. 52/653.2 |
| 5,800,003 A | | 9/1998 | Clenet ......................... 296/29 |
| 5,818,008 A | * | 10/1998 | Cecil .......................... 219/110 |
| 5,831,235 A | | 11/1998 | Cecil |
| 5,845,382 A | | 12/1998 | Schultz et al. ............. 29/421.1 |
| 5,848,853 A | | 12/1998 | Clenet ....................... 403/272 |
| 5,953,945 A | | 9/1999 | Horton |
| 5,992,897 A | * | 11/1999 | Hill et al. ..................... 285/55 |
| 6,010,155 A | * | 1/2000 | Rinehart ..................... 219/61.2 |
| 6,037,556 A | * | 3/2000 | Rudd ........................ 219/61.2 |
| 6,092,865 A | * | 7/2000 | Jaekel et al. ................. 296/205 |
| 6,131,954 A | * | 10/2000 | Campbell ................. 296/146.5 |
| 6,209,372 B1 | * | 4/2001 | Freeman .................. 219/86.25 |
| 6,346,684 B1 | * | 2/2002 | Gabbianelli et al. ........ 219/617 |
| 6,405,761 B1 | * | 6/2002 | Shimizu et al. ............. 138/109 |

* cited by examiner

WELDING ASSEMBLY WITH NESTABLE CONDUCTIVE ENDS

This application is a continuation-in-part of application Ser. No. 09/518,646, filed Mar. 3, 2000, which is hereby incorporated by reference in its entirety.

FIELD OF THE INVENTION

The present invention relates generally to a welding assembly. More specifically, the present invention relates to a welding assembly, which provides sufficient force and current through conductive ends to create a surface-to-surface weld between weldable members.

BACKGROUND OF THE INVENTION

Welding devices are used in many industrial applications, such as vehicle construction on vehicle assembly lines. To form some welded connections, a desired amount of welding material must be placed between the surfaces of the weldable members where the welded joint is to be formed. This type of welded joint is difficult to form when the weldable members are tubular in form because it becomes difficult to directly access the welding surfaces. For example, traditional spot welds cannot supply sufficient current through the contact surfaces of the members to form the welded connection.

Moreover, tubular hydroforming technology is increasingly being used in industry, particularly in the automotive industry. Hydroforming technology offers many advantages for automobile frame construction, but difficulties in welding hydroformed components arise due to the tubular shape of the parts as described above.

Thus, there is a need in the automotive industry for a technology that allows rapid, low cost joint formation between tubular hydroformed members. Specifically, there is a need for a welding device, which can join tubular members together with a surface-to-surface joining technique. This invention addresses these needs in the art as well as other needs, which will become apparent to those skilled in the art once given this disclosure.

SUMMARY OF THE INVENTION

One object of the present invention is to provide a welding device for joining weldable members together.

Another object of the invention is to provide a welding device for joining tubular hydroformed members together.

Yet another object of the invention is to provide a welding device which provides sufficient force and current through conductive ends to create a surface-to-surface weld between weldable members.

Still a further object of the invention is to provide a welding device wherein conductive ends are substantially the same size as the weldable members.

Still a further object of the invention is to provide a welding device wherein conductive ends nest with the weldable members.

Still a further object of the invention is to provide a welding device that is mounted on a movable robot.

The foregoing objects are basically attained by providing a welding device, comprising a first welding part having a first support and a first conductive end capable of being engaged to a structure to be welded; and a second welding part coupled to the first welding part and having a second conductive end capable of being engaged to the structure to be welded, the first conductive end having a first base coupled to the first support, and a first contoured portion coupled to and extending away from the first base and including a first concave recess to nest with the structure to be welded.

The foregoing objects are further attained by providing a combination of a welding device and at least one weldable member, comprising a first weldable member having a first longitudinal axis and a first cross-section transverse to the longitudinal axis, the cross-section being closed, hollow, and having a first width; a welding device having a first welding part and a second welding part coupled to the first welding part, the first welding part having a first support and a first conductive end and the second welding part having a second conductive end, the first conductive end having a first base coupled to the first support and a first surface opposite to the first base and engaged with the first weldable member, the first surface extending along substantially the entire extent of the first width of the first weldable member.

The foregoing objects are further attained by providing a welding device, comprising a first welding part having a first support and a first conductive end coupled to the first support and capable of being engaged with a structure to be welded; a transformer coupled to the first conductive end; and a force-applying mechanism coupled to the first support, the first welding part, the transformer, and the force-applying mechanism forming a single structure supported by and mounted on a mechanism and movable between first and second welding positions.

The foregoing objects are further attained by providing a combination of a welding device and at least one weldable member, comprising a first weldable member having a first longitudinal axis and a first cross-section transverse to the longitudinal axis, the cross-section being closed, hollow, and having first and second opposing sides; a welding device including a first welding part having a first support and a first conductive end, the first conductive end having a first base coupled to the first support and a first surface opposite to the first base and engaged with the first weldable member, the first surface being substantially coextensive with the first side of the first weldable member to permit electricity to flow through the first conductive end and the first weldable member.

The foregoing objects are further attained by providing a method of welding, comprising providing a first weldable member having a first longitudinal axis and a first cross-section transverse to the longitudinal axis, the cross-section being closed, hollow, and having first and second opposing sides; providing a welding device including a first welding part having a first support and a first conductive end, the first conductive end having a first base coupled to the first support and a first surface opposite to the first base; engaging the first surface of the welding device with the first side of the first weldable member such that the first surface is substantially coextensive with the first side of the first weldable member; and conducting electricity through the first conductive end of the welding device and the first weldable member by conducting electricity though the first surface of the welding device and the first side of the first weldable member.

These and other objects, features, and advantages of this invention will become apparent from the following detailed description when taken in conjunction with the accompanying drawings, which are a part of this disclosure and which illustrate, by way of example, the principles of this invention.

BRIEF DESCRIPTION OF THE DRAWINGS

The accompanying drawings facilitate an understanding of the various embodiments of this invention. In such drawings.

DETAILED DESCRIPTION OF THE INVENTION

Figure 1:
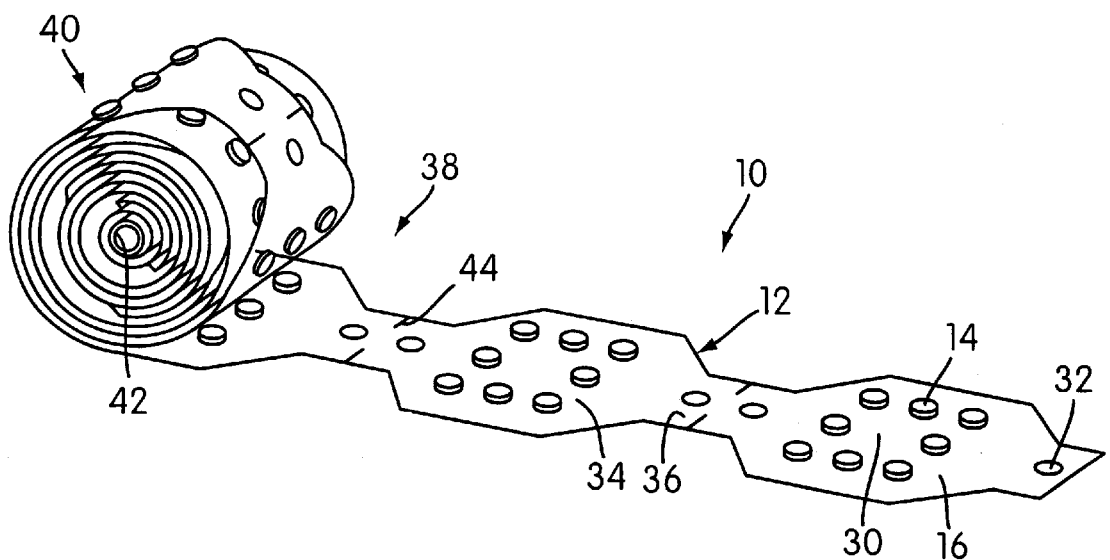
FIG. 1 is a perspective view of a welding material strip assembly constructed according to the principles of the present invention.

FIG. 1 shows a welding material strip assembly, generally designated 10, that is made up of a plurality of welding material assemblies 12 removably joined together to form a rollable continuous strip. Each welding material assembly 12 includes at least one welding material member 14 mounted on a flexible carrier sheet 16 in a predetermined arrangement. As will become apparent, a carrier sheet 16 can be removed from the strip assembly 10 and placed between two surfaces where a welded connection is to be formed to thereby position the welding material members 14 carried by the carrier sheet 16 between the surfaces.

More particularly, each welding material assembly 12 is constructed and arranged to position welding material in electrically conductive relation between the exterior surface portions of first and second weldable members at a location where the first and second weldable members are to be joined. Each welding material member 14 is constructed of an electrically conductive metallic welding material capable of melting when heated by application of an electrical current. Each flexible carrier sheet 16 is constructed of a material that is electrically nonconductive, and each welding material member 14 is mounted on the carrier sheet 16 such that when the sheet is placed between exterior surfaces of first and second weldable members to be welded, each welding material member 14 is electrically conductively disposed therebetween.

Figure 2:
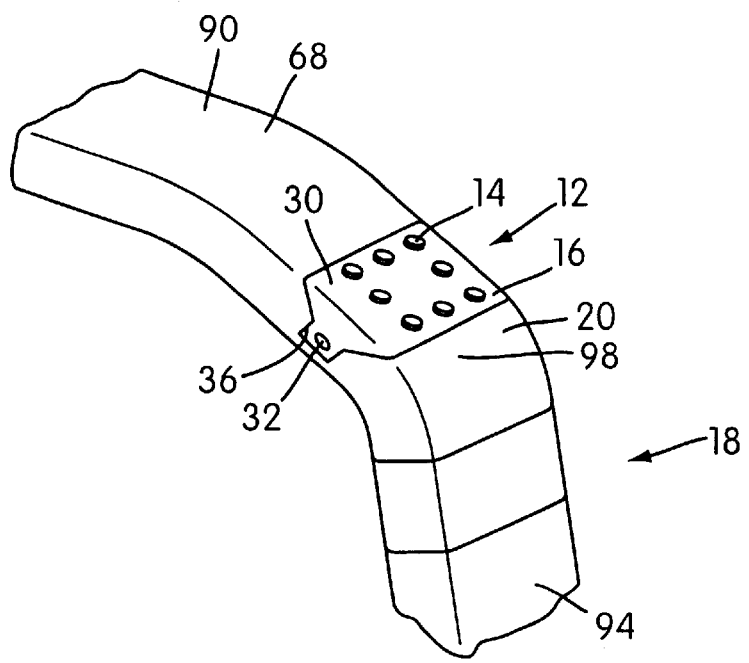
FIG. 2 is a perspective view of a welding material assembly constructed according to the principles of the present invention mounted on a first weldable member.
Figure 3:
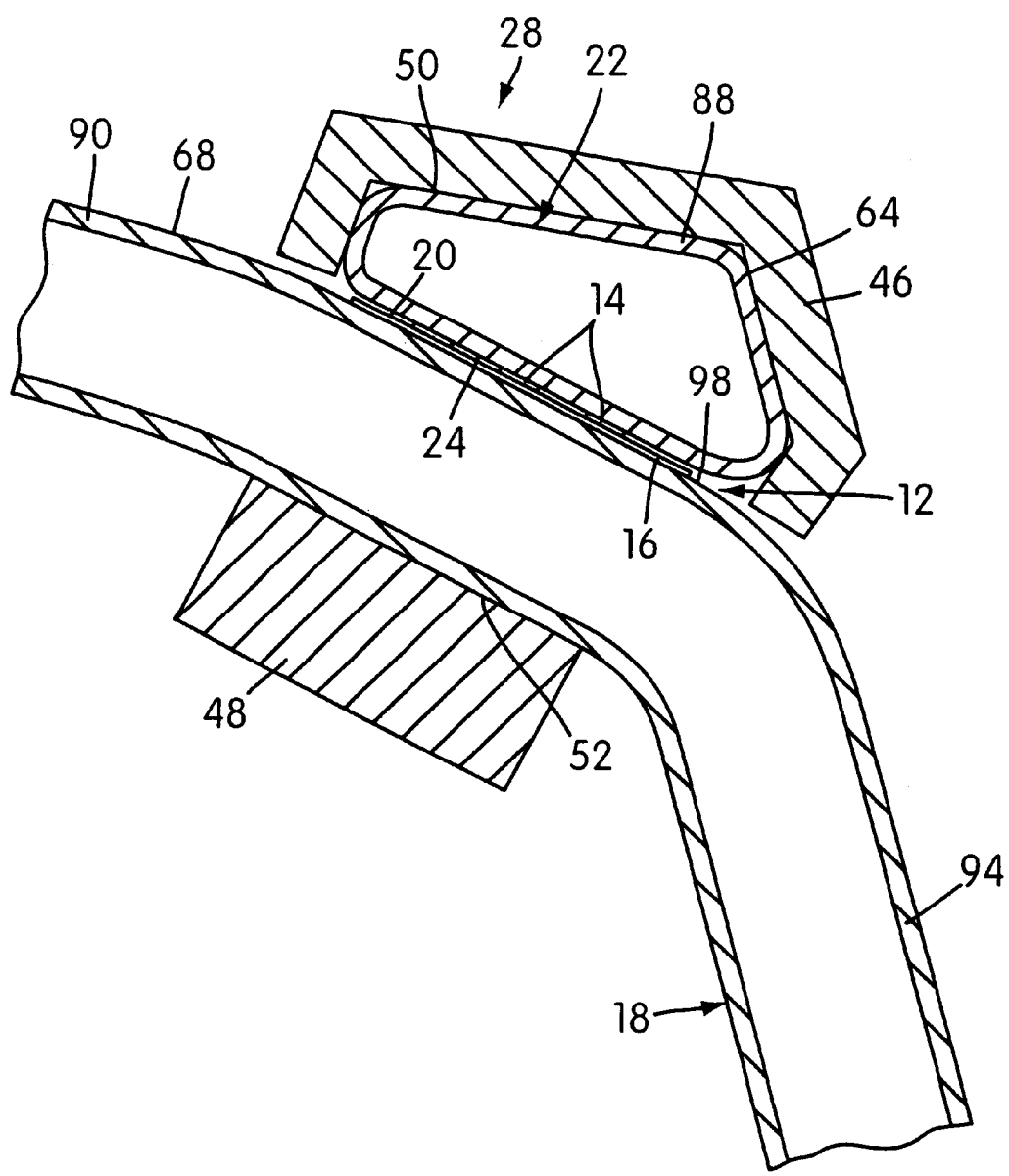
FIG. 3 is a cross-sectional view showing the welding material assembly disposed within a portion of a welding assembly in accordance with the present invention wherein the welding material assembly is disposed between the first weldable member and a second weldable member prior to joint formation and showing a resistance welding apparatus engaged with the weldable members, the cross-section of FIG. 3 is taken along a similar line as FIG. 9.
Figure 4:
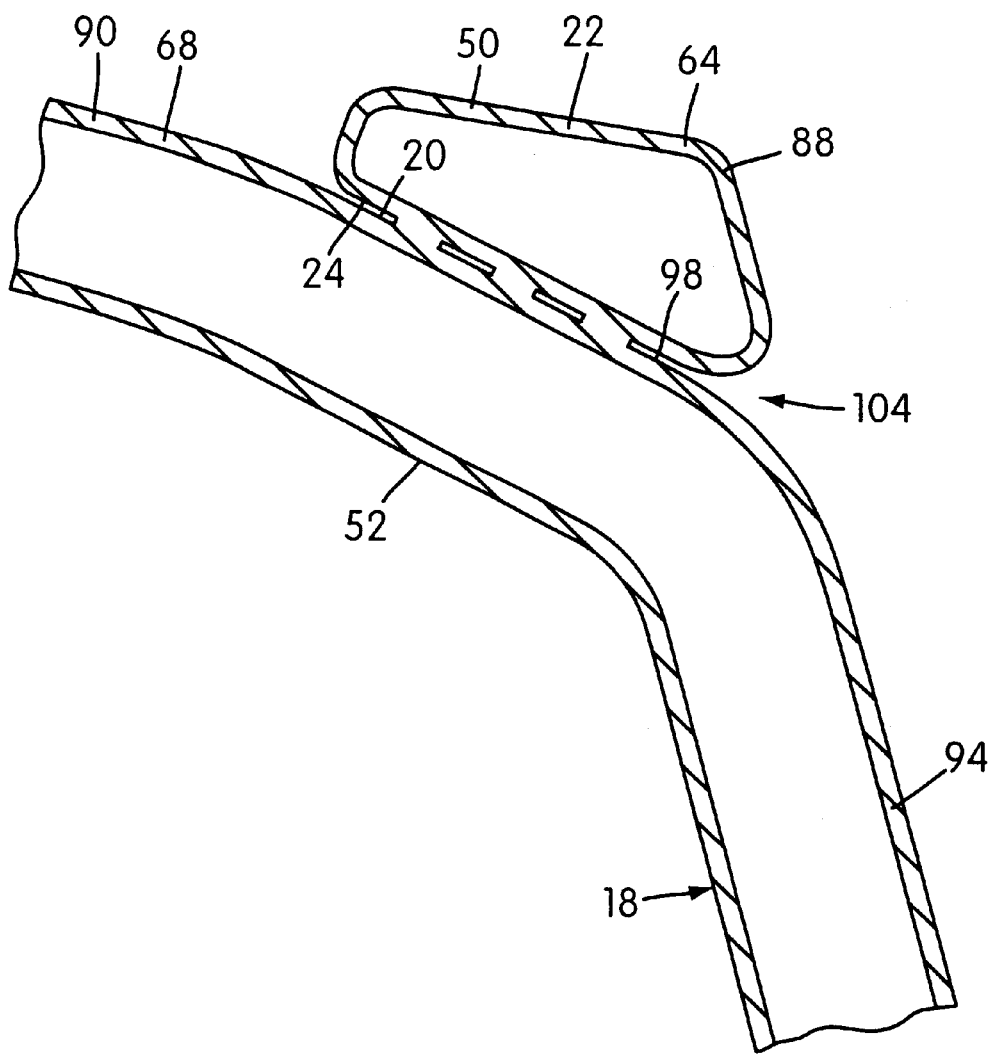
FIG. 4 is a view similar to FIG. 3 except showing the first and second weldable members after joint formation in accordance with the present invention.
Figure 5:
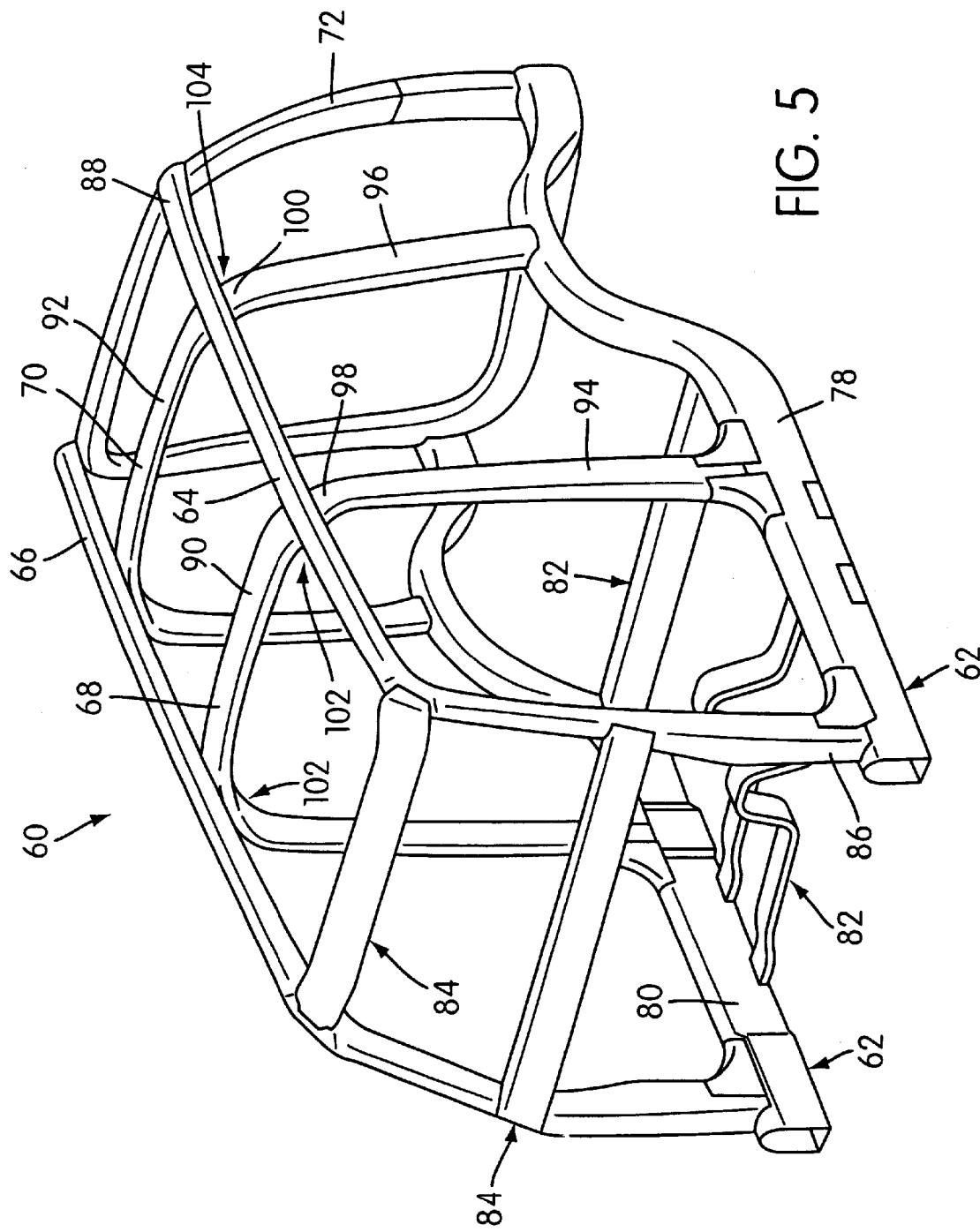
FIG. 5 shows a perspective view of a space frame for a motor vehicle that includes joints formed according to the present invention.

The details of the construction and use of the welding material assemblies 12 can be understood from FIGS. 2–4. FIG. 2 shows an individual welding material assembly 12 mounted on an exterior surface portion 20 of a second weldable member 18, which is illustrated in the form of a second tubular hydroformed member. FIG. 3 shows a first weldable member 22 in the form of a first tubular hydroformed member disposed in overlying relation to the second weldable member 18 with the welding material assembly 12 disposed therebetween. The first weldable member 22 and the second weldable member 18 in FIGS. 2–4 are intended to be a generic representation of two members that can be welded together using a welding material assembly 12 in a manner described below. As will become apparent, the exemplary first member 22 and the second member 18 are used to illustrate the welding process are portions of individual hydroformed members that are joined together to form part of a space frame as shown in FIG. 5. A modified resistance weld apparatus, or welding device, generally designated 28, is shown schematically in FIG. 3 engaged with the weldable members 18, 22. FIG. 4 shows the first weldable member 22 and the second weldable member 18 after joint formation.

The welding process illustrated in FIGS. 3–4 is a derivative of resistance welding and utilizes transient liquid phase bonding and resistance heating. The welding material assembly 14 can be used, for example, to join together two tubular hydroformed members 18, 22. The welding material assembly 14 and a preferred method of using the same provide a way for individual hollow hydroformed sections of the pair of hydroformed members 18, 22 to be welded together in adjoining relation without direct access to the welding surfaces 20, 24, respectively, of the weldable members 18, 22 while the welded connection (or joint) is being formed.

The welded connection is formed by positioning at least one welding material member 14 constructed of a metallic welding material that is different from the metallic material used to construct each of the weldable hydroformed members 18, 22 between the exterior surfaces 20, 24 to be joined. Preferably a plurality of welding material members 14 are mounted on each carrier sheet 16 (although only one is required) for positioning between the surfaces 20, 24 to be joined (i.e., welded together) and preferably these welding material members are arranged on each carrier sheet 16 to position the welding material members 14 to maximize joint strength and optimize joint formation. In the exemplary embodiment of the welding material assembly 12 shown in FIGS. 1–3, each welding material member 14 is a thin, small diameter disk-shaped member, but it can be understood that a wide range of welding material member shapes and sizes are contemplated.

The size and shape selected for each of the welding material members 14 will depend on many factors including the materials used to construct the weldable members, the material used to construct the welding material members and the size and shape of the joint area between the two weldable members (i.e., the size and shape of the overlapping surface areas of the two weldable members). Each welding material member is shown being a circular disc, but can have any desired shape. As mentioned, it is contemplated to provide welding material assemblies in which a single welding material member is mounted on each carrier sheet. A range of broad, thin shapes (e.g., a large X-shape) of the welding material member is contemplated for instances in which only one welding material member is mounted on each sheet 16. Preferably a plurality of welding material members 14, each being in the form of a small thin disk is mounted on each carrier sheet, however, because this thin, small diameter disk shape most readily permits discreet localized areas of electric current flow between the weldable members 18, 22 which facilitates melting of the members 14.

A preferred welding material for the welding material members 14 is stainless steel in the instance in which the hydroformed weldable members 18, 22 are constructed of a mild steel, which is also preferred. It is contemplated, however, to use a wide range of metallic welding materials to construct the welding material assemblies and to use the assemblies to form welded connections between weldable members that are constructed of other materials, such as aluminum.

The welding material used to construct each welding material member 14 should be more resistive (i.e., have a greater resistance to the flow of electrical current) and have a lower melting point than the metallic material used to construct each weldable member 18, 22.

The carrier sheets 16 allow the welding material members 14 to be easily handled and to be held in a predetermined configuration between the surfaces 20, 24 to be welded together before the weld is formed. Preferably a central portion 30 of each carrier sheet 16 has a size and shape that corresponds to the area of the overlap between the overlying exterior adjacent surfaces 20, 24 to be bonded and preferably the welding material members 14 are of a predetermined size and shape and are arranged in a predetermined pattern to assure optimal bonding between the weldable members 18, 22.

Preferably each carrier sheet 16 is constructed of an electrically nonconductive paper or plastic material that disintegrates during the welding process to an extent sufficient to permit the welding material members 14 to expand in diameter when melted during welding. The carrier sheet 16 should be thinner than the welding material members 14 so that the carrier sheet 16 does not interfere with the forces applied during welding as will be described. The welding material members 14 are attached to the carrier sheet 16 preferably by forcing the welding material members 14 into preformed holes in the carrier sheet 16, so that the welding material members 14 become wedged in the preformed holes.

Preferably the carrier sheet 16 further includes a plurality of securing weldable material members 32 constructed and arranged to affix the carrier sheet 16 to a surface of one of the weldable members such as surface 20 of a metallic member 18 at a location thereon where a welded connection is to be formed. The securing weldable material members 32 hold the carrier sheet 16 in place while the first weldable member 22 is placed in overlying relation thereto. In the exemplary embodiment of the welding material assembly 12 shown, for example, in FIG. 2, the carrier sheet 16 has a pair of tapered portions 34 on each side of the central portion 30 that terminate in narrow end portions 36. A securing weldable material member 32 is provided on each end portion 36 to enable the assembly 12 to be welded to the sides of one of the hydroformed members prior to resistance welding.

Alternatively, the members 32 can be adhesive members such as a two-faced tape or any other appropriate structure that can hold the carrier sheet 16 to one hydroformed member while the other hydroformed member is placed in overlying relation.

As mentioned above and as shown in FIG. 1, the individual weld carrier sheets 16 can be removably attached end-to-end to form the welding material strip assembly 10. Because the carrier sheets 16 are thin and flexible, the welding material strip assembly 10 can be easily wound into a roll 40. The exemplary strip assembly 10 is shown in FIG. 1 wound around a spindle 42 for easy storage, shipping and handling. The carrier sheets 16 are preferably manufactured as a continuous strip of material that is perforated at boundaries between adjacent end portions 36 by a series of small aligned slits 44, although a wide range of manufacturing methods and structures for removably securing the sheets together is contemplated.

To form a joint in accordance with the method of the invention, one carrier sheet 16 is removed from the welding material strip assembly 10 to separate one welding material assembly 12 from the continuous strip. The single welding material assembly 12 is placed on the exterior surface portion 20 of the second hydroformed member 18 (FIG. 2) in the location where the joint is to be formed and is held there by the securing weldable material members 32. The first hydroformed member 22 is placed in overlying relation to the sheet 16 (FIG. 3) so that the exterior surface 24 is in contact with the welding material members 14.

The modified resistance weld gun apparatus 28, or welding device, (or a modified spot welding gun) is used to apply an electrical current and an axial force (i.e., a force perpendicular to the two exterior surfaces 20, 24 in the weldable members 18, 22) across the two hydroformed members 18, 22 and across the welding material members 14 during joint formation. More particularly, the apparatus 28 includes a pair of current conducting members 46, 48, or conductive ends, (that supply an electrical current from a current source to form the weld) that are applied to exterior surfaces 50, 52 of the two hydroformed members 18, 22 to be joined in the area where the weld connection or joint therebetween is to be formed. The weld gun apparatus 28 can be controlled manually or robotically.

The conductive members, or conductive ends 46, 48, are electrodes that cause a current to flow through the surfaces 20, 24 to be bonded (i.e., joined) and through the welding material members 14. Because the material of the carrier sheet 16 is not electrically conductive, the carrier sheet 16 prevents shunting during the welding process (that is, while a current is being supplied by the apparatus 28). The welding material is more resistive and has a lower melting point than the base joint metallic material used to construct the hydroformed members 18, 22. The material properties of the contiguous members 14, 18, 22 combine to create preferential heating and subsequent localized melting of the welding material members 14 prior to the melting of the hollow section material of the hydroformed members 18, 22. The welding material members 14 liquefy during the welding process.

The energy required to liquefy the welding material members 14 is generated by the applied electrical current. The welding material members heat up preferentially and cause melting of the welding material members 14 and then localized melting of the adjacent metallic material of the hydroformed members 18, 22. The melted material of the welding material members 14 bonds with the basic metallic material of the hydroformed members 18, 22 under the axial pressure applied by the conductive members, or conductive ends 46, 48. After the aforementioned melting occurs, the current flow through the surfaces 20, 24 is switched off. The axial force is preferably removed a predetermined amount of time thereafter.

The resulting welded connection is represented in FIG. 4. The carrier sheet 16 has been substantially disintegrated in FIG. 4. In addition, as shown, a very thin gap is left between the hydroformed members 18, 22. The combining of the metallic materials of the metal members 14, 18, 22 is indicated in the cross sectional view of FIG. 4. It can be appreciated that this representation of the welded area is enlarged and exaggerated to more clearly illustrate the welded connection and to indicate the mixing of the metallic materials in the areas where the weld is formed.

Preferably the current is applied through the first weldable member 22 and the second weldable member 18 and across the welding material members 14 so as to melt the welding material members 14 and thereafter to melt portions of the first weldable member 22 and the second weldable member 18 in areas thereof that are adjacent to the welding material members and preferably the forces are applied so as to move the exterior surfaces 20, 24 toward one another.

Preferably, each of the exterior surfaces 20, 24 is planar, although they may be of any configuration that is adapted for joint formation. For example, the surfaces can have complimentary convex/concave configurations and the like.

It can be understood that the welding material assemblies 12 and methods for using the same are particularly well suited for forming joints between individual hydroformed members. It is contemplated to use the welding material assemblies 12 and the methods of the present invention to form joints between the individual hydroformed members used to construct a space frame for a motor vehicle. An example of a method for using a welding material assembly 12 for forming a space frame joint is described below. The example is described with reference to an exemplary embodiment of a space frame for a sports utility vehicle shown in FIG. 5. Other examples of space frame joints that are particularly well suited for use with the present welding material assemblies and with methods utilizing the assemblies are disclosed in commonly assigned U.S. patent application Ser. No. 09/173,554 and entitled HYDROFORMED SPACE FRAME AND METHOD OF MANUFACTURING THE SAME, which is hereby incorporated by reference in its entirety into the present application for all material disclosed therein.

FIG. 5 shows a perspective view of a motor vehicle space frame 60. The space frame 60 includes a pair of longitudinally extending, laterally spaced side rail structures 62, a pair of hydroformed upper longitudinal members 64, 66, a pair of hydroformed U-shaped cross members 68, 70 and a rearward ring assembly 72. Preferably the side rail structures 62 are provided by a pair of hydroformed members 78, 80 of mirror image construction. A plurality of laterally extending cross structures generally designated 82 are connected between the side rail structures 62 and a pair of laterally extending upper cross structures 84 are connected between the pair of upper longitudinal members 64, 66.

Each hydroformed upper longitudinal member 64, 66 includes a pillar forming portion 86 and a longitudinally extending portion 88. Each upper longitudinal member 64, 66 is connected to an associated side rail structure 62 and extends upwardly therefrom to form an A pillar of the space frame 60. Each hydroformed cross member 68, 70 includes a cross portion 90, 92, respectively, and a pair of leg portions 94, 96, respectively, extending from junctures 98, 100 at opposite ends of the associated cross portion. Each leg portion of the cross member is connected to a respective side rail structure 62 and extends upwardly therefrom to provide an intermediate pillar thereon (i.e., the B pillars and C pillars). The longitudinally extending portion 88 of each upper longitudinal member 64, 66 is connected to the juncture 98, 100 of the associated cross member 68, 70 to form a joint 102, 104, respectively.

The structure of the side rail structures 62 (and thus of the side rail members 78, 80), the rearward ring assembly 72 and the cross structures 82, 84 and the manner in which these components are assembled to the space frame 60 are described in the above incorporated Ser. No. 09/173,554 and this description will not be repeated in the present application.

Each upper longitudinal member 64, 66 and each cross member 68, 70 is preferably of tubular hydroformed construction and each is formed by hydroforming a metallic wall of a tubular blank so that each hydroformed member is defined by an outwardly deformed metallic wall fixed into a predetermined exterior surface configuration corresponding to that of the hydroforming die cavity. Preferably, the blank is hydroformed so that the tubular wall is irregularly outwardly deformed during the hydroforming process.

A complete description of the hydroforming process is included in Ser. No. 09/173,554 and is incorporated by reference into the present application. Consequently, the hydroforming process will not be considered in the present application in detail, but will be briefly described so that the use of the welding material assembly 12 in space frame construction can be understood.

Hydroforming Method

Figure 6:
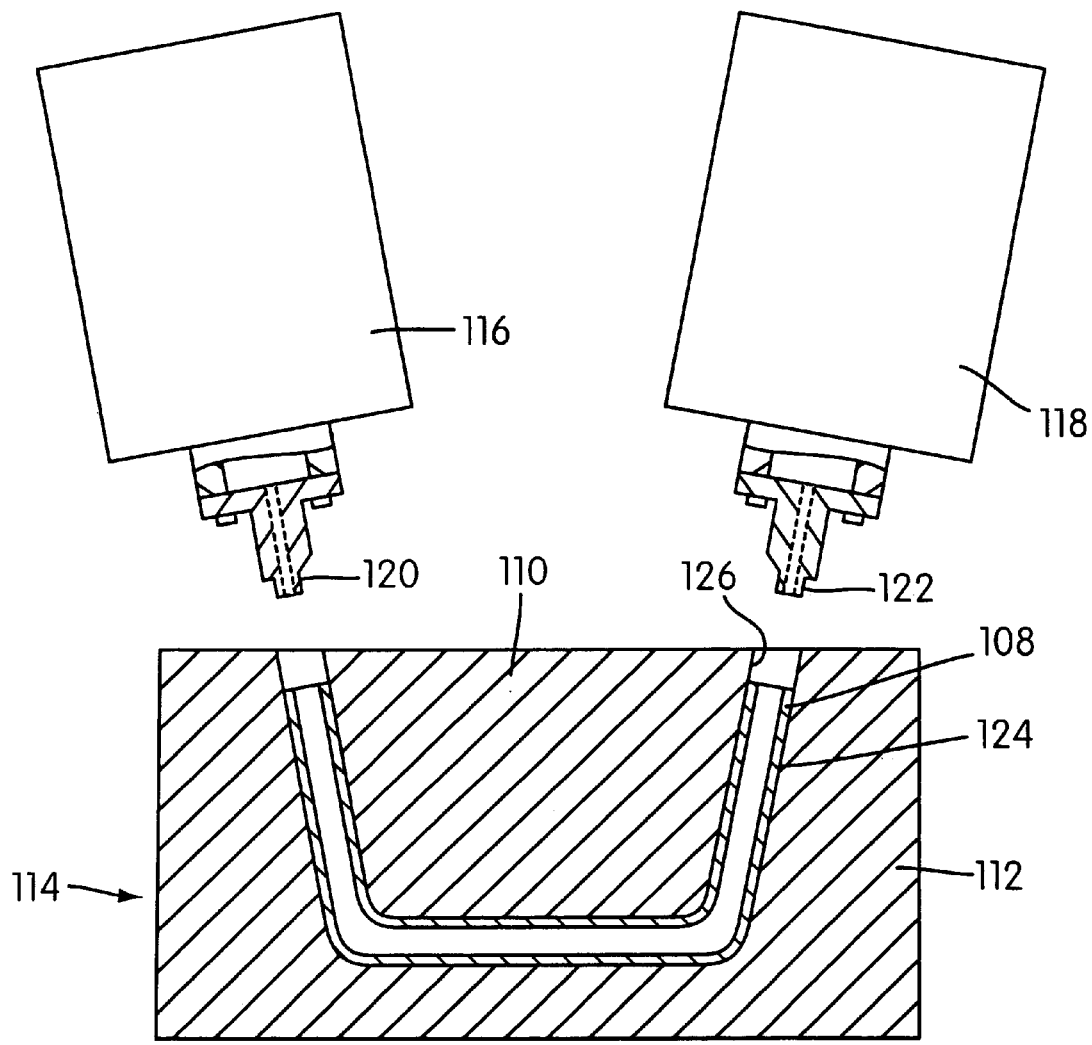
FIG. 6 shows a schematic view of a hydroforming die assembly.
Figure 7:
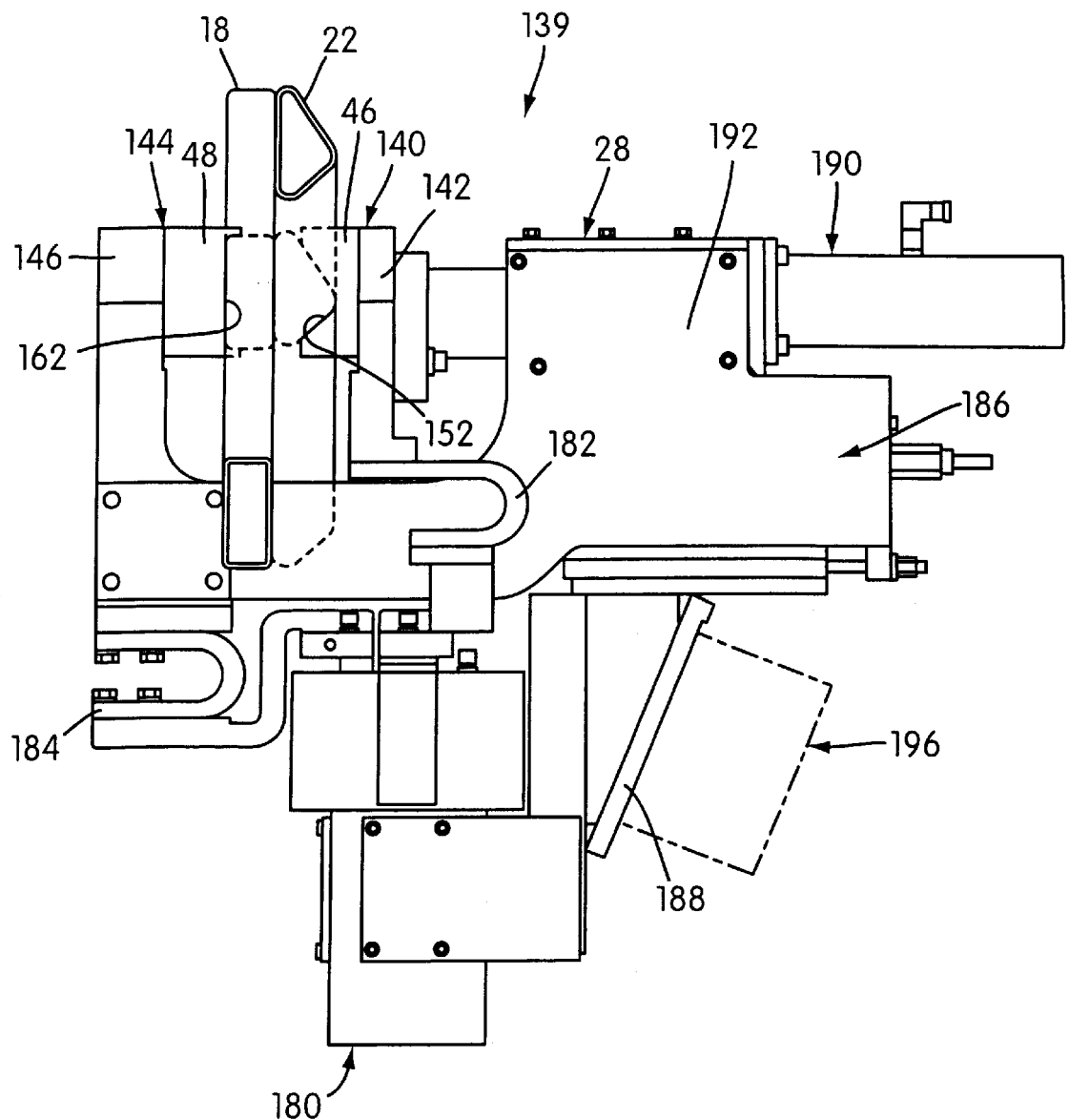
FIG. 7 is a front view of a welding assembly constructed in accordance with the principles of the present invention including a welding gun and two weldable members.
Figure 8:
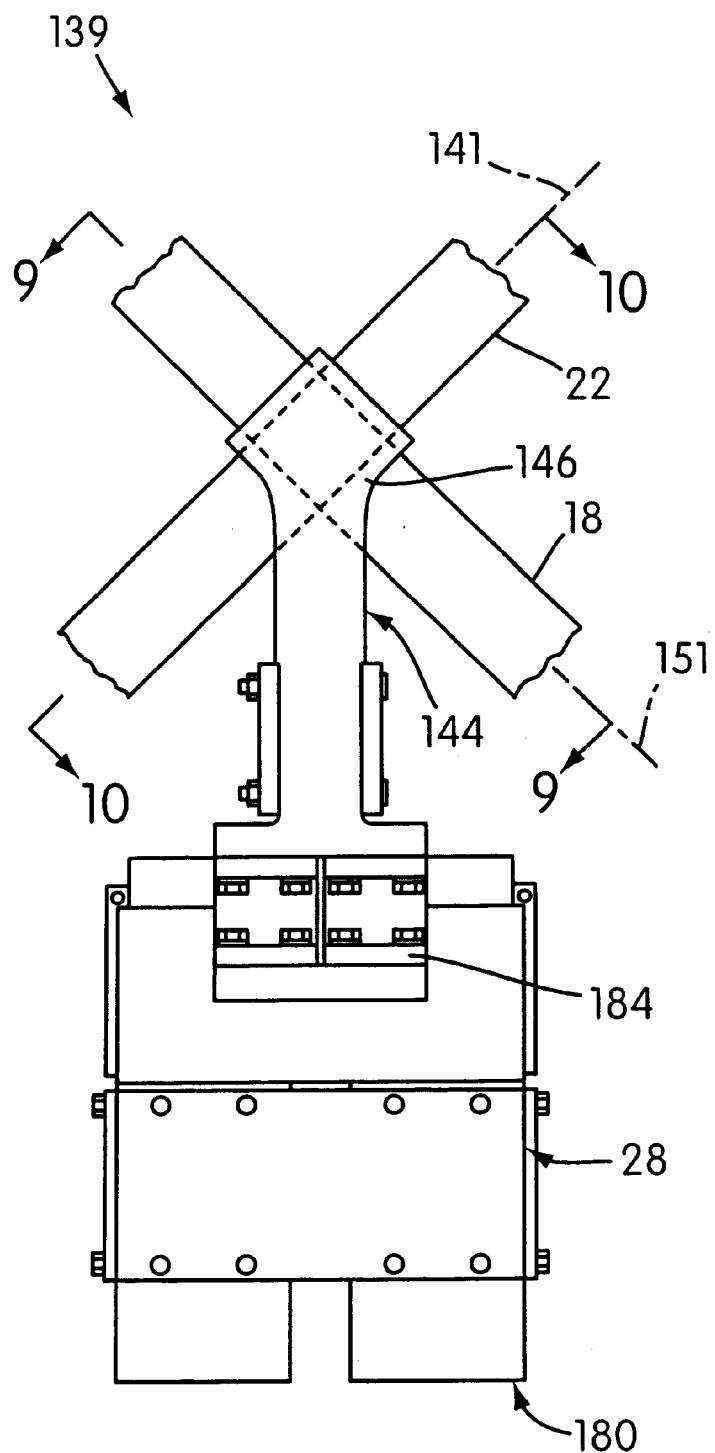
FIG. 8 is a side view of the welding assembly of FIG. 7.

The preferred hydroforming process for forming each hydroformed member of the exemplary space frame 60 can be understood from FIG. 6. Each hydroformed member is formed from a tubular blank 108 constructed of a first metallic material. The blank 108 has a closed transverse cross section, open tubular ends and a predetermined length.

If the geometry of the part is complex or if there are to be any sharp bends (a bend of greater than 30°) in the finished member, the blank 108 may optionally be bent prior to hydroforming. Preferably the blank is bent according the teachings of U.S. Pat. No. 5,953,945, entitled METHOD AND APPARATUS FOR WRINKLE-FREE HYDROFORMING OF ANGLED TUBULAR PARTS, which is hereby incorporated by reference in its entirety. It should be understood that the methodology of U.S. Pat. No. 5,953,945 would preferably not be used for parts that are bent at an angle of less than 30°.

The blank 108 is then placed between the die halves 110, 112 of a die assembly 114 and the assembly is closed. The die assembly 114 can be a single cavity or multicavity tool, depending on the configuration of the hydroformed member to be produced. The blank 108 is filled with hydroforming fluid and a hydroforming ram assembly 116, 118 engages each end of the blank 108. The hydroforming process uses an internal high pressure of hydroforming fluid to form the tubular blank into the desired shape. A ram member 120, 122 of each assembly 116, 118 seals a respective end of the blank 108. The ram members 120, 122 include hydraulic intensifiers which can intensify the hydroforming fluid, thereby increasing the fluid pressure within the blank 108 to outwardly deform the tubular metallic wall, generally designated 124, of the tubular blank 108 into conformity with the die surfaces 126 of the die cavity to thereby form a hydroformed member having an exterior surface that is fixed into a predetermined configuration based on the shape of the die cavity.

That is, the tubular blank 108 expands into conformity with the surfaces 126 defining the hydroforming die cavity so as to irregularly (or regularly) outwardly expand the metallic wall 124 of the blank 108 into conformity with the surfaces 108 of the die assembly 114 to provide the metallic wall 124 with a shape corresponding to the desired shape for the member. The shape of each die cavity used to form each hydroformed member of the space frame 60 in accordance with the present invention is particularly adapted to the shape of the new and advantageous hydroformed tubular members contemplated herein.

It can be appreciated that the transverse cross section of many of the hydroformed members of the space frame 60 varies along the length of a particular hydroformed member. It can be understood that altering the cross-sectional configuration of any of the tubular hydroformed members shown and/or described herein can be accomplished without departing from the principles of the present invention so that the use of the welding material assemblies and the welding methods of the present invention is not limited to hydroformed members having any particular cross-sectional configuration. The cross sections of the members can be regular (i.e., uniform) or irregular (i.e., nonuniform).

From the description of the exemplary welding material assembly 12, the exemplary space frame 60 and the hydroforming process, it can be understood that the welding material assemblies can be used to form joints between individual tubular hydroformed space frame members during space frame construction. An example of the construction of the space frame joint 102 is shown in and can be understood from FIGS. 2–4. Thus, it can be understood from the general description of the welding methods set forth above that the hydroformed cross member 68 comprises the second weldable member 18 referred to above and that the hydroformed upper longitudinal member 64 is the first weldable member 22. It can be understood that many methods of forming a space frame (and of forming space frame joints) for a motor vehicle are contemplated, a preferred method comprising forming each of a pair of upper longitudinal members 64, 66 and a cross member 68 in a hydroforming procedure. Each hydroforming procedure includes: providing a tubular blank 108 constructed of a first metallic material; placing the blank 108 into a die assembly 114 having die surfaces 126 defining a die cavity; providing pressurized fluid in an interior of the blank 108 to expand the metallic wall of the blank into conformity with the die surfaces 126 thereby forming a hydroformed member 64, 66 or 68 defined by an outwardly deformed metallic wall fixed into a predetermined exterior surface configuration. Each upper longitudinal member 64, 66 is a one-piece, integrally formed hydroformed member and includes a pillar forming portion 86 and a longitudinally extending portion 88. The inverted U-shaped cross member 68 is a one-piece integrally formed hydroformed member having a pair of leg portions 94 extending from junctures 98 at each end of a cross portion 90. Each longitudinally extending portion 88 and each juncture 98 includes an exterior surface portion 24 and 20, respectively, (see, for example, the cross section of FIG. 3). A pair of side rail structures 62 are provided, preferably by a pair of tubular hydroformed members; The side rail structures 62 are assembled with the members 64, 66, 68 such that (1) the pillar forming portion 86 of each upper longitudinal member 64, 66 is connected to and forms a pillar structure (e.g., the A pillar) on a respective side rail structure 62, (2) each leg portion 94 of the cross member 68 is connected to a respective side rail structure 62 and provides an intermediate pillar thereon (e.g., the B pillar), and (3) the surface portion 24 of each upper longitudinal member 64, 66 and the surface portion 20 of the associated juncture 98 of the cross member 68 are in adjacent relation to one another. Each joint 102, one on each end portion of the cross portion 90, is formed at the upper corners of the space frame 60 by positioning the weldable members 64, 66, 68 and a welding material assembly 12 such that the welding material members 14 are disposed in current transmitting relation between the associated exterior surface portions 24, 20 to be welded together. An electrical current and forces are applied across the weldable members 64, 68 such that the applied current flows through the associated pair of surfaces 24, 20 and through each welding material member 14 disposed therebetween so as to melt each welding material member 14 and thereby weld the exterior surface portions 24, 20 to one other.

Preferably the current is applied across associated pairs of weldable members 64, 68 and 66, 68, respectively, and across each welding material member 14 so as to melt each welding material member 14 and thereafter to melt portions of each weldable member 64, 68 and 66, 68 of each associated pair in areas adjacent each welding material member 14 and wherein the forces are applied so as to move the exterior surface portions (surfaces 24, 20 of the pair 64, 68, for example) of the associated weldable members of each pair toward one as the welding material members 14 are melting.

It can be understood that the hydroformed members to be joined (the pair 64, 68, for example) can be hydroformed to have surface portions 24, 20 of a wide range of shapes and sizes. Preferably, each member 64, 68 is hydroformed so that the exterior surface portions 24, 20, respectively, are planar, although the surfaces 24, 20 can be of any complimentary configuration such as concave/convex.

It is contemplated to construct the individual space frame hydroformed members from a wide range of materials. Any weldable and hydoformable metallic material of suitable strength can be used in the construction of the individual hydroformed components for the space frame. In one preferred embodiment, each at least one welding material member 16 of each assembly 12 is constructed of a stainless steel and each tubular hydroformed member 64, 66, 68 is constructed of a milder steel.

It can be appreciated that the space frame 60 is similar to space frames shown and described in the above incorporated Ser. No. 09/173,554 except that in the exemplary space frames shown in Ser. No. 09/173,554, the juncture of each hydroformed cross member is in overlying relation to the longitudinally extending portion of each associated upper longitudinal member, whereas in the present application, this relation is reversed so that the longitudinally extending portion 88 of each upper longitudinal member 64, 68 is in overlying relation to (i.e., above) the associated juncture 98, 100 of the cross member 68, 70. It can be understood, however, that it is within the scope of the present invention to use the welding material assemblies 12 and the methods of the present invention to form a joint between the longitudinally extending portion of each upper longitudinal member and the juncture of the associated cross member in the space frames constructed as shown in Ser. No. 09/173,554 as well.

The weld created using the welding material assembly 12 forms a space frame joint that is comparable in strength to a joint formed by conventional MIG welding, but a joint formed utilizing a welding material assembly in a shorter period of time relative to MIG welding and by adding a lesser amount of heat to the joint than the amount of heat which is added to a hydroformed joint during MIG welding. The relatively high degree of heat transferred to the joint area of the hydroformed members during a MIG weld operation is undesirable because this heat generated by MIG welding adds to the distortion of, and hence the dimensional inaccuracy of, the space frame. The use of a welding material assembly and of joint forming methods which use the welding material assembly do not generate a comparable amount of heat during joint formation and therefore increase the dimensional accuracy of the space frame over MIG welding.

While the welding material strip assembly provides particular advantages in welding tubular hydroformed weldable members, it is contemplated that it may also have application in welding other weldable members that have not been hydroformed, but which nevertheless inhibit access to the weld surfaces.

Referring now more particularly to FIGS. 7–12, a preferred embodiment of a welding assembly 139 in accordance with the invention is illustrated. The welding assembly 139 comprises the welding device or gun 28, the first weldable member 22, and the second weldable member 18. The welding device or welding gun 28 provides a way for sections of the pair of hydroformed members 18, 22 to be welded together in adjoining relation without direct access to the welding surfaces 20, 24, respectively, of the members 18, 22 while the welded connection is being formed.

The first weldable member 22 has a first longitudinal axis 141 and a first cross-section transverse to the first longitudinal axis 141. The first weldable member 22 is illustrated in the form of a first tubular, hydroformed member such that the first cross-section is closed, hollow, and has a first width $W_1$. The first width $W_1$ encompasses the exterior surface 50.

The second weldable member 18 has a second longitudinal axis 151 and a second cross-section transverse to the second longitudinal axis 151. The second weldable member 18 is illustrated in the form of a second tubular, hydroformed member such that the second cross-section is closed, hollow, and has a second width $W_2$. The second width $W_2$ encompasses the exterior surface 52. Although members 18, 22 are described as tubular, hydroformed members, any appropriate type of weldable member can be used with the gun 28. For example, tubular members not formed by hydroforming or non-tubular members can be welded together by gun 28.

The weldable members 18, 22 represent portions of individual tubular hydroformed members that are joined together to form part of a structure such as the space frame 60, as shown in FIG. 5. As described in greater detail above, the hydroformed cross member 68 comprises the second weldable member 18 and the hydroformed upper longitudinal member 64 comprises the first weldable member 22. One of the joints 102 is formed at upper corners of the space frame 60 by positioning the weldable members 64, 68 and the welding material assembly 12 such that the welding member 14 is disposed in current transmitting relation between associated exterior surface portions 24, 20 to be welded together.

The gun 28 includes first and second welding parts 140, 144, respectively, which attach to weldable members 22, 18, respectively. The welding parts 140, 144, together with various other parts discussed below, form a single structure 186 to form gun 28. As illustrated in the drawings, the gun can further include a transformer 180, an air cylinder 190, and a robot mount 188.

The first welding part, generally shown at 140, has a first support 142 and includes conductive end 46, referred to as a first conductive end. The first conductive end 46 is capable of being connected to a structure to be welded, such as the first weldable member 22. The second welding part, generally shown at 144, is coupled to the first welding part 140 through gun structure 186 and has a second support 146 and the conductive end 48, referred to as a second conductive end. The second conductive end 48 is capable of being connected to the structure to be welded, such as the second weldable member 18.

Figure 9:
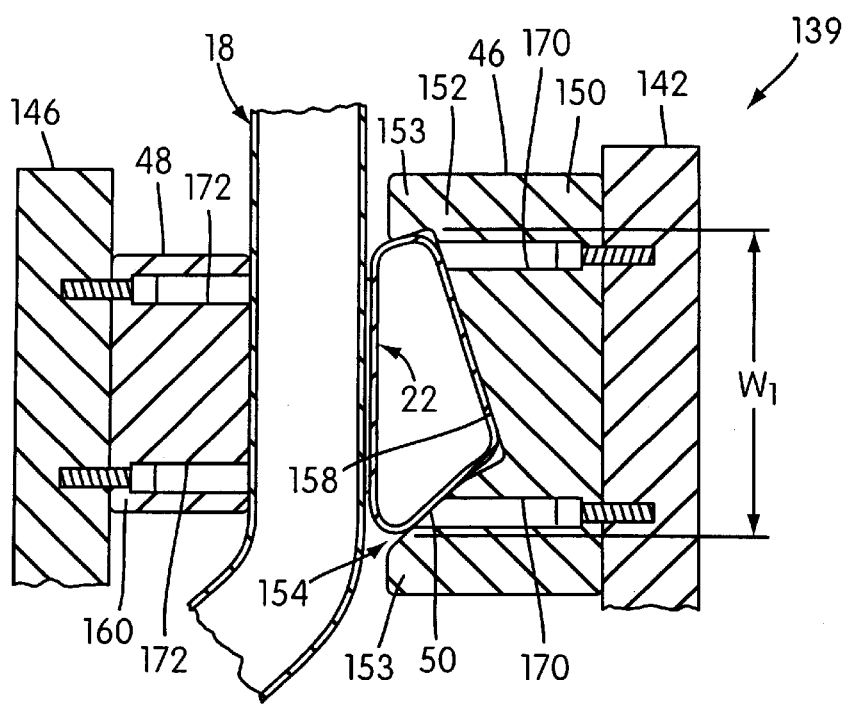
FIG. 9 is a cross-sectional view of the welding assembly taken along line 9—9 of FIG. 8.
Figure 10:
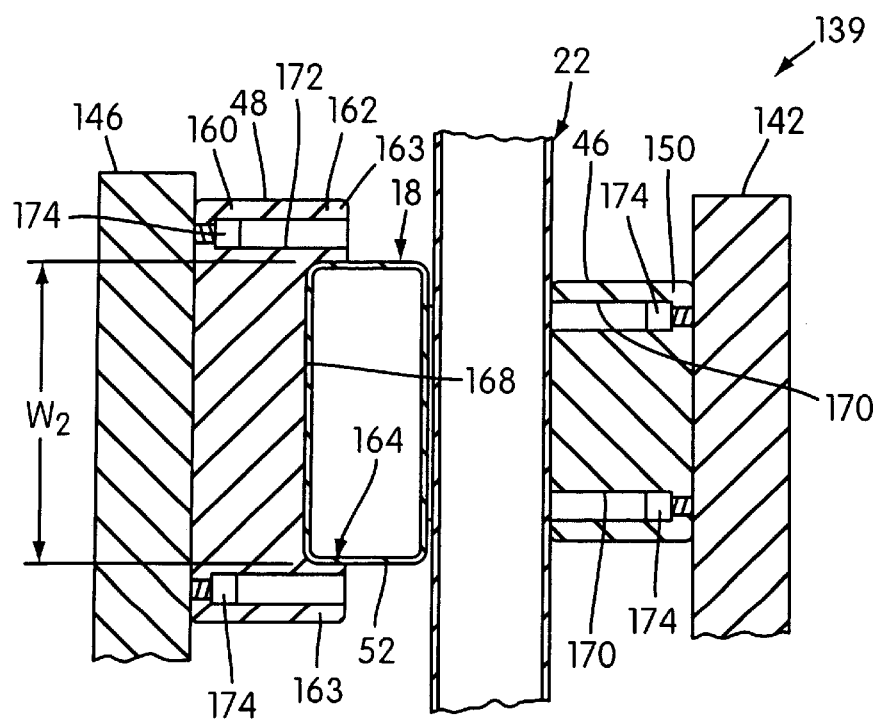
FIG. 10 is a cross-sectional view of the welding assembly taken along line 10—10 of FIG. 8.

Specifically, as best seen in FIGS. 9 and 10, the first conductive end 46 has a first base 150 coupled to the first support 142 and a first contoured portion 152. The first contoured portion 152 is integrally formed with and extends away from the first base 150 and includes a first concave recess 154 to nest with the structure to be welded, in this case member 22. The first contoured portion 152 has flanged ends 153 that rest on ends of the structure to be welded to further enhance the nesting feature.

The second conductive end 48 has a second base 160 coupled to the second support 146 and a second contoured portion 162. The second contoured portion 162 is integrally formed with and extends away from the second base 160 and includes a second concave recess 164 to nest with the structure to be welded, in this case member 18. The second contoured portion 162 has flanged ends 163 that rest on ends of the structure to be welded to further enhance the nesting feature.

As seen in FIGS. 9 and 10, the first conductive end 46 and the second conductive end 48 each have a plurality of bores 170, 172, respectively. The bores 170 and 172 extend through their respective conductive end 46, 48 such that fasteners 174, such as bolts or screws, may be inserted through the bores 170, 172 for coupling to the first and second supports 142, 146, respectively.

The first conductive end 46 has a first contoured surface 158 opposite to the first base 150 which is nested with the exterior surface 50 of the first weldable member 22 during the welding operation. The first surface 158 of the end 46 preferably extends along substantially the entire extent of the first width $W_1$ of the first weldable member 22 along the portion of exterior surface 50 that faces end 46.

The second conductive end 48 has a second contoured surface 168 opposite to the second base 160 which is nested with the exterior surface 52 of the second weldable member 18 during the welding operation. The second surface 168 of the end 48 extends along substantially the entire extent of the second width $W_2$ of the second weldable member 18 along the portion of exterior surface 52 that faces end 48.

In the illustrated embodiment, the first conductive end 46 has a generally V-shaped cross-section with a generally V-shaped recess and the second conductive end 48 has a generally U-shaped cross-section with a generally U-shaped recess as shown in FIGS. 9–10. However, the conductive ends 46, 48 and their respective contoured surfaces 158, 168 may be of any shape and size that permits each contoured surface 158, 168 to nest with and extend along the width of the members to be welded.

The conductive parts 140 and 144 are preferably formed as integral, one-piece, unitary elements from a conductive material such as copper.

The transformer 180 is attached to the structure 186 and is coupled to the first conductive end 46 to apply current through the weldable members 18, 22 for a welding operation. Specifically, the transformer 180 discharges the required current through an upper shunt 182 to the first support 142. The current passes through the first support 142, the first conductive end 46, the first weldable member 22, the welding material member 14, and the second weldable member 18, successively, to create the bond. The current continues to pass out the second conductive end 48 and the second support 146 to the transformer 180 through a lower shunt 184. The weld current and cycle time are closely controlled to create the bond between the first weldable member 22 and the second weldable member 18. The transformer 180 is capable of delivering up to 65,000 Amps (Mid-frequency DC).

The force applying mechanism 190, illustrated as an air cylinder, is coupled to the first support 142. Pressure is applied by the air cylinder 190 through an equalizing unit 192 which encloses the weldable members 18, 22 by the conductive ends 46, 48. An equal force is applied to the exterior surfaces 50, 52 of the weldable members 18, 22 so as to move the exterior surfaces 20, 24 toward one another while not deforming the weldable members 18, 22. Any appropriate force applying mechanism can be used. For example, the force applying mechanism can be an air cylinder. A typical air cylinder for applying force to tubular members of an automobile frame would generally be capable of exerting 1,250 pounds of pressure.

As appreciated from above, electrical current and force is applied across the weldable members 18, 22 such that the applied current melts each welding material member 14 and thereby connects the exterior surfaces portions 24, 20 to one another with the weld created by the melted welding material 14.

Figure 11:
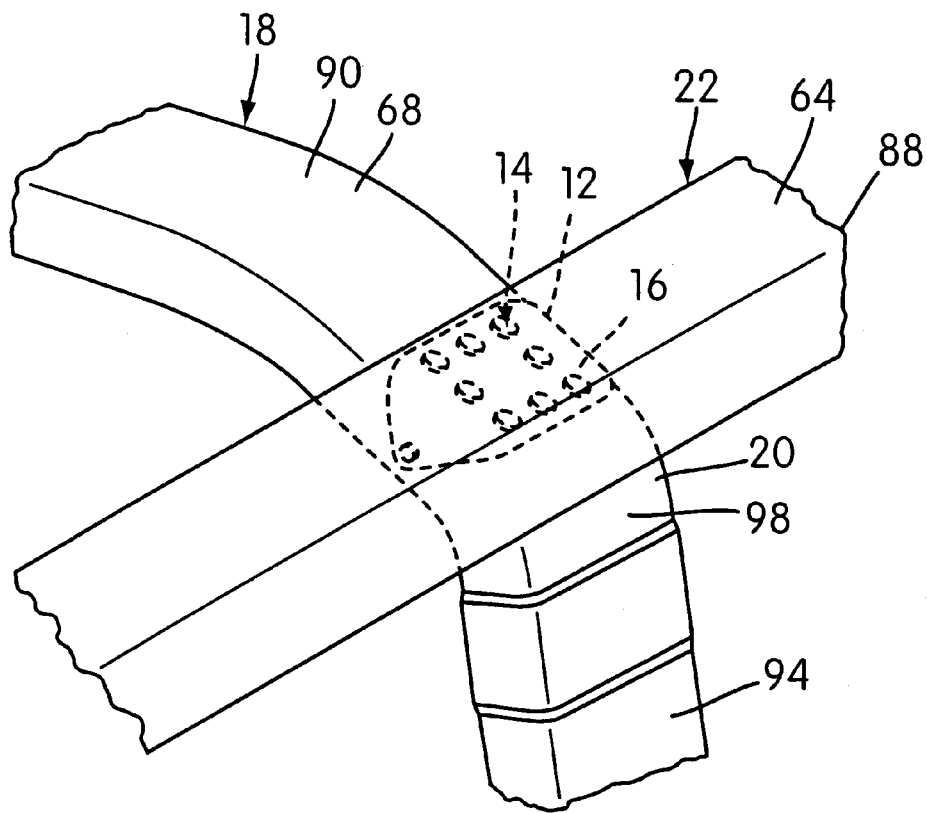
FIG. 11 is a perspective view showing a completed weld joint in accordance with the invention illustrating the second weldable member disposed in overlying relation to the first weldable member with the welding material assembly disposed therebetween.

Specifically, in performing a welding operation, the cover sheet 16 is removed from the strip assembly 10 and secured to one of the weldable members, such as exterior surface 20 of the second weldable member 18 where a welded connection is to be formed. Another weldable member, such as the first weldable member 22, is placed in overlying relation thereto, such that exterior surfaces 20, 24 are positioned in electrically conductive relation with the welding material members 14, as shown in FIG. 11.

Electrical current is applied by the transformer 180 across the exterior surfaces 50, 52 of the hydroformed members 18, 22. Because the first and second surfaces 158, 168 of the conductive ends 46, 48 extend along and nest with the entire extent of the first and second widths $W_1$, $W_2$, respectively, sufficient current is applied and flows through the weldable members 18, 22, the surfaces 20, 24, and the welding material member 14 to create the bond. The nesting configuration between the conductive ends 46 and 48 and the weldable members 18 and 22 form an excellent electrical connection since the contact between the members is so extensive in the area of the weld and facilitates the flow of electricity required to form the weld. The welding material members 14 then melt and bond with the hydroformed members 18, 22 under the axial pressure applied by the air cylinder 190 to the conductive ends 46, 48 and the electricity supplied by the transformer 180.

After melting occurs, the current flowing through the surfaces 20, 24 provided by the transformer 180 is switched off and the axial force applied by the air cylinder 190 is preferably removed a predetermined amount of time thereafter. The resulting welded connection is shown in FIG. 4 which exemplifies the metallic materials of members 14, 18, 22 being combined.

Preferably, each of exterior portion 20, 24 is planar as shown, although they may be of any configuration that is adapted for joint formation. For example, the surfaces can have complimentary convex/concave configurations and the like. Further, the exterior surfaces 50, 52 of members 18, 22 may also be of any appropriate configuration. Differently configured surfaces 50 and 52 will preferably have differently configured conductive ends 46 and 48 having differently configured contoured portions 152 and 162 that correspond to the shape of the exterior surfaces 50 and 52.

Figure 12:
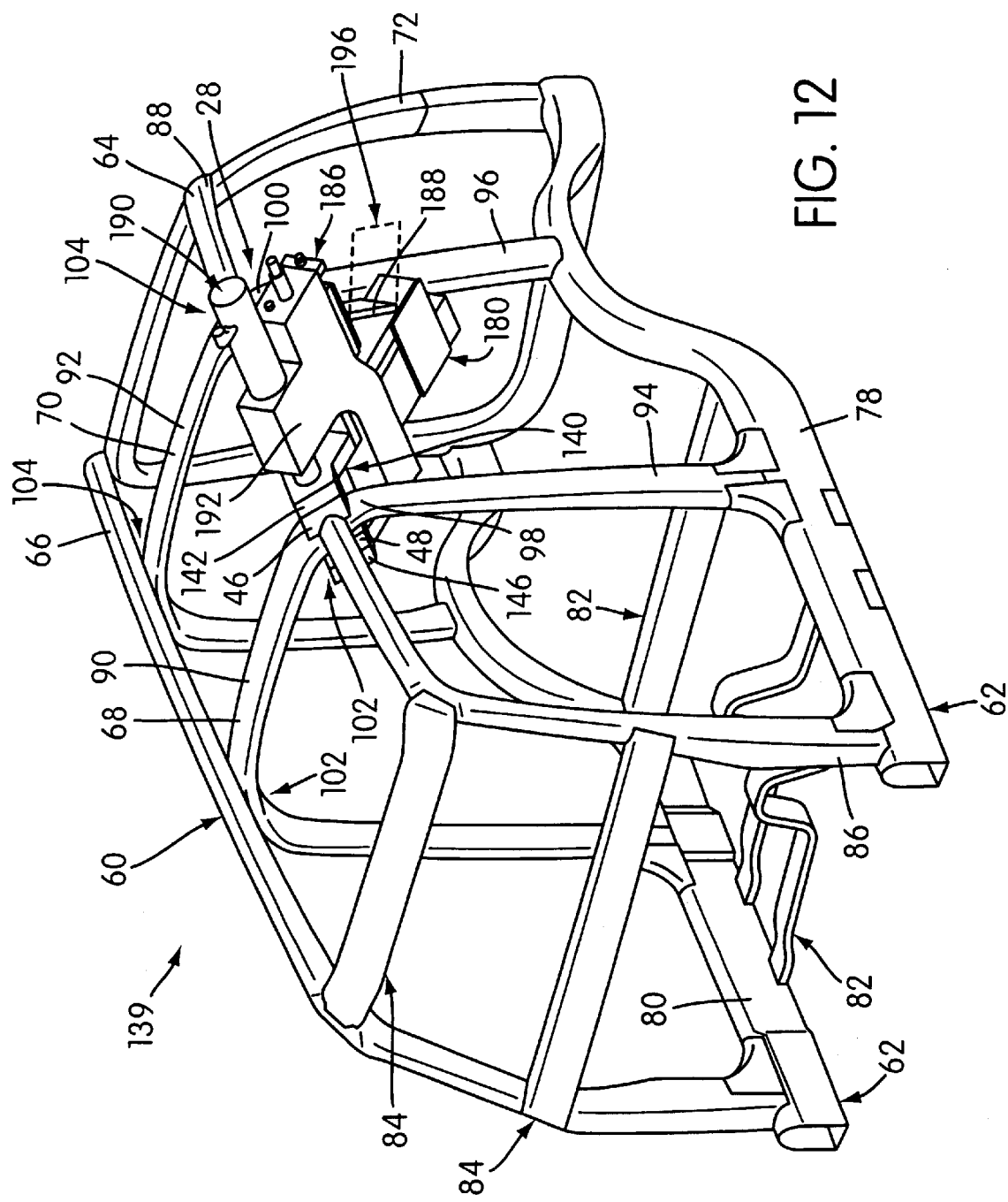
FIG. 12 is a perspective view of a space frame as shown in FIG. 5 with a welding device in accordance with the principles of the present invention, oriented in a welding position.

Referring now more particularly to FIG. 12, the gun 28 can be mounted in any appropriate manner to weld two members together. Preferably, the gun 28 is mounted so that it can be easily moved between welding positions. For example, the gun 28 can be mounted on a robot 196, as illustrated in FIG. 12, so that it can be movable between first and second welding positions. The illustrated structure 186 in FIG. 12 includes the robot mount 188 for mounting the structure 186 to the robot 196. A movable mount for gun 28 such as the robot 196, facilitates the welding process because the robot 196 enables the gun 28 to be moved to multiple positions about the space frame 60 to perform multiple welding operations. Of course, a computer can control the manipulation of the robot, if desired, to create an automated process.

In use, the robot 196 can position the gun 28 in current transmitting relation with weldable members 64, 68 to form the joint 102. After completion of the welding operation, the robot can move the gun 28 to complete the joint 102 by joining weldable members 66, 68. Further joints can be performed on the space frame 60 such as joint 104 comprised of members 64, 66, 70.

It can thus be appreciated that the objectives of the present invention have been fully and effectively accomplished. The foregoing specific embodiments have been provided to illustrate the structural and functional principles of the present invention and is not intended to be limiting. To the contrary, the present invention is intended to encompass all modifications, alterations, and substitutions within the spirit and scope of the appended claims.

What is claimed is:

1. A method of welding, comprising:

providing a first weldable member having a first longitudinal axis and a first cross-section transverse to the longitudinal axis, the cross-section being closed, hollow, and having first and second opposing sides;

providing a welding device including a first welding part having a first support and a first conductive end, the first conductive end having a first base coupled to the first support and a first surface opposite to the first base;

engaging the first surface of the welding device with the first side of the first weldable member such that the first surface is substantially coextensive with the first side of the first weldable member;

conducting electricity through the first conductive end of the welding device and the first weldable member by conducting electricity though the first surface of the welding device and the first side of the first weldable member;

providing a second weldable member having a second longitudinal axis and a second cross-section transverse to the second longitudinal axis, the second cross-section being hollow, closed, and having first and second opposing sides;

providing a second welding part to the welding device, the second welding part having a second support and a second conductive end, the second conductive end having a second base coupled to the second support and a second surface opposite to the second base;

engaging the second surface of the welding device with the first side of the second weldable member such that the second surface is substantially coextensive with the first side of the second weldable member, and the electricity conducted through the first weldable member being conducted through the second weldable member and through the second conductive end of the welding device by conducting electricity though the first side of the first weldable member and the second surface of the welding device;

inserting a welding material between the first and second weldable members; and the flow of electricity through the first and second weldable members liquefies the welding material and forms a weld between the first and second weldable members at the location of the welding material through the bonding of the welding material to both the first and second weldable members under pressure exerted by said welding device.

2. A method according to claim 1, further comprising:

forming the first and second weldable member by hydroforming.

3. A method according to claim 1, wherein the inserting a welding material includes inserting weldable material formed as a plurality of nuggets between the first and second weldable members.

4. A method according to claim 1, wherein the providing a second weldable member includes positioning the second weldable member in an abutting relationship against the first weldable member such that the second longitudinal axis of the second weldable member is transverse to and spaced from the first longitudinal axis of the first weldable member.

5. A method of welding, comprising:

providing a first weldable member having a first longitudinal axis and a first cross-section transverse to the longitudinal axis, the cross-section being closed, hollow, and having a first side;

providing a second weldable member having a second longitudinal axis and a second cross-section transverse to the second longitudinal axis, the second cross-section being hollow, closed, and having a second side;

inserting a welding material between the first and second weldable members;

providing a welding device including a first welding part having a first surface and a second welding part having a second surface;

engaging the first surface of the welding device with the first side of the first weldable member such that the first surface is substantially coextensive with the first side of the first weldable member;

engaging the second surface of the welding device with the second side of the second weldable member such that the second surface is substantially coextensive with the second side of the second weldable member; and conducting electricity through the first surface of the welding device, the first side of the first weldable member, the second side of the second weldable member and the second surface of the welding device, the flow of electricity through the first and second weldable members liquefying the welding material and forming a weld between the first and second weldable members at the location of the welding material through the bonding of the welding material to both the first and second weldable members under pressure exerted by said welding device.

6. A method according to claim 5, wherein the inserting a welding material includes inserting weldable material formed as a plurality of nuggets between the first and second weldable members.

7. A method according to claim 5, wherein the providing a second weldable member includes positioning the second weldable member in an abutting relationship against the first weldable member such that the second longitudinal axis of the second weldable member is transverse to and spaced from the first longitudinal axis of the first weldable member.

8. A combination of a welding device and at least one weldable member, comprising:

a first weldable member having a first longitudinal axis and a first cross-section transverse to said longitudinal axis, said cross-section being closed, hollow, and having a first width, said first width having a first conductive surface extending along the entire extent of said first width, the first conductive surface having a first nonarcuate section;

a welding device having a first contacting surface engaged with said first conductive surface, said first contacting surface extending along and contacting said first conductive surface along substantially the entire extent of said first width of said first weldable member, the first contacting surface having a nonarcuate portion contacting said first conductive surface.

9. A combination according to claim 8, further comprising:

a second weldable member abutting said first weldable member, said second weldable member having a second longitudinal axis and a second cross-section transverse to said second longitudinal axis, said second cross-section being closed, hollow, and having a second width, said second width having a second conductive surface extending along the entire extent of said second width, the second conductive surface having a second nonarcuate section; and said welding device having a second contacting surface engaged with said second conductive surface, said second contacting surface extending along and contacting said second conductive surface along substantially the entire extent of said second width of said second weldable member, the second contacting surface having a second nonarcuate portion contacting said second conductive surface.

10. A combination according to claim 8, wherein said first weldable member is hydroformed and said first conductive surface includes a generally flat section.

11. A combination according to claim 8, wherein said first and second weldable members are hydroformed and each of said first and second conductive surfaces includes a generally flat section.

12. A combination according to claim 8, wherein said first and second weldable members are hydroformed and each of said first and second conductive surfaces and each of said first and second contacting surfaces includes multiple, generally flat sections.

13. A combination according to claim 8, further comprising:

a welding material positioned between said first and second weldable members, said welding material being a separate element with respect to said first and second weldable members.

14. A combination of a welding device and at least one weldable member, comprising:

first weldable member having a first longitudinal axis and a first cross-section transverse to said longitudinal axis, said cross-section being closed, hollow, and having a first width, said first width having a first conductive surface extending along the entire extent of said first width, the first conductive surface having a first nonarcuate section;

a welding device having a first contacting surface engaged with said first conductive surface, said first contacting surface extending along and contacting said first conductive surface along substantially the entire extent of said first width of said first weldable member, the first contacting surface having a nonarcuate portion contacting said first conductive surface;

a welding material positioned between said first and second weldable members, said welding material being a separate element with respect to said first and second weldable members, said welding material includes welding material formed as a plurality of nuggets.

15. A combination according to claim 9, wherein said second weldable member abuts against said first weldable member such that said second longitudinal axis of said second weldable member is transverse to and spaced from said first longitudinal axis of said first weldable member.

* * * * *

UNITED STATES PATENT AND TRADEMARK OFFICE
CERTIFICATE OF CORRECTION

PATENT NO. : 6,566,624 B2
DATED : May 20, 2003
INVENTOR(S) : Gabbianelli et al.

It is certified that error appears in the above-identified patent and that said Letters Patent is hereby corrected as shown below:

<u>Title page,</u>
Item [57], ABSTRACT,
Please amend the ABSTRACT to read as follows:
-- A welding material in positioned in electrically conductive relation between exterior surface portions of first and second weldable members, such as hydroformed tubes, at a location where the first and second weldable members are to be joined. A welding device comprises first and second electrodes or conductive ends that extend along substantially the entire extent of first sides of the first and second weldable members, respectively. The first and second conductive ends include first and second concave recesses, which nest with the first and second weldable members, respectively. Axial pressure and electrical current are applied across the first and second weldable members by the nesting first and second conductive ends. The applied current melts the welding material and thereby welds the exterior surface portions to one another. The welding device can be mounted on a robotic mechanism, which can move the welding device between first and second welding positions. --

Signed and Sealed this

Second Day of December, 2003

JAMES E. ROGAN
*Director of the United States Patent and Trademark Office*